United States Patent [19]

Otokawa

[11] Patent Number: 4,843,491
[45] Date of Patent: Jun. 27, 1989

[54] RECORDING AND REPRODUCING APPARATUS WITH TRACK PITCH DETECTION

[75] Inventor: Mitsuhiro Otokawa, Kanagawa, Japan

[73] Assignee: Canon Kabushiki Kaisha, Tokyo, Japan

[21] Appl. No.: 911,907

[22] Filed: Sep. 25, 1986

[30] Foreign Application Priority Data

Sep. 26, 1985 [JP] Japan ............................... 60-210970

[51] Int. Cl.$^4$ ............................................. G11B 15/52
[52] U.S. Cl. ............................ 360/73.07; 360/73.05; 360/70
[58] Field of Search ...................... 360/69, 70, 73, 75, 360/77, 10.1, 27, 66

[56] References Cited

U.S. PATENT DOCUMENTS

| | | | |
|---|---|---|---|
| 4,520,405 | 5/1985 | Sasaki et al. | 360/66 |
| 4,550,345 | 10/1985 | Terada et al. | 360/27 |
| 4,568,986 | 2/1986 | Furuhata et al. | 360/10.1 |
| 4,594,621 | 6/1986 | Noguchi et al. | 360/70 |
| 4,599,660 | 7/1986 | Kozuki et al. | 360/77 |
| 4,607,298 | 8/1986 | Yamashita | 360/77 |
| 4,618,899 | 10/1986 | Doutsubo | 360/73 |

FOREIGN PATENT DOCUMENTS 53-96805 8/1978 Japan.
58-100255 6/1983 Japan.
57-1838 7/1983 Japan.

*Primary Examiner*—Aristotelis M. Psitos
*Assistant Examiner*—David L. Robertson
*Attorney, Agent, or Firm*—Robin, Blecker & Daley

[57] ABSTRACT

A recording and reproducing apparatus in which track pitch is determined by using a signal reproduced by a rotary head which is also used for erasing.

16 Claims, 4 Drawing Sheets

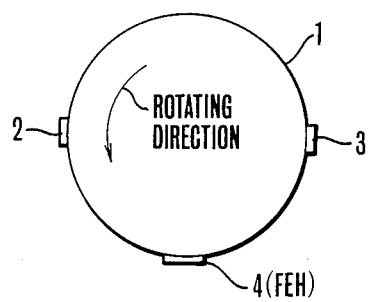
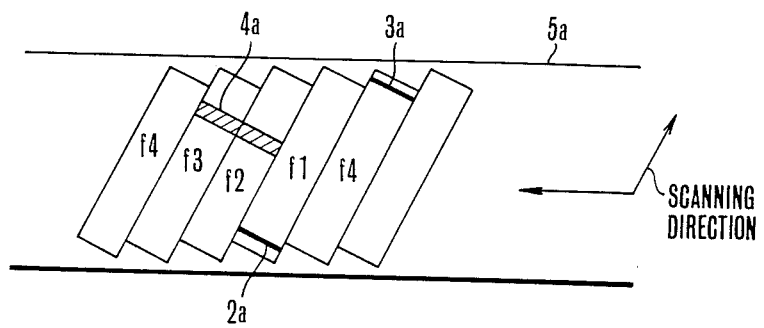

RECORDING AND REPRODUCING APPARATUS WITH TRACK PITCH DETECTION

BACKGROUND OF THE INVENTION

1. Field of the Invention

This invention relates to a recording and reproducing apparatus and more particularly to an apparatus which is arranged to record a signal on a recording medium while forming recording tracks on the medium selectively at some of a plurality of different track pitches and to reproduce the signal from the recording medium.

2. Description of the Related Art

Some of the conventional video tape recorders (hereinafter referred to as VTR) has been arranged to be capable of setting a plurality of tape travel speeds and thus to be capable of recording signals at a plurality of different track pitches. This arrangement necessitates discrimination between one track pitch and another in carrying out reproduction. In the case of a VTR of the type arranged to record a control signal relative to recording tracks in the longitudinal direction of a recording tape, for example, the above-stated track pitch discrimination is made by reproducing this control signal.

Meanwhile, a VTR of another type arranged not to record the above-stated control signal but to perform tracking control by the so-called four-frequency method, for example, has been making the track pitch discrimination by using a portion of a signal produced by a recording/reproducing head arrangement. However, it has been a problem with the VTR of this type that the track pitch discrimination cannot be accurately and promptly accomplished without recourse to complex structural arrangement.

SUMMARY OF THE INVENTION

It is a general object of this invention to provide a recording and reproducing apparatus which is capable of solving the above-stated problem of the prior art.

It is a more specific object of this invention to provide a recording and reproducing apparatus which is capable of accurately and promptly discriminating the track pitch at which recording tracks are formed during recording.

It is another specific object of this invention to provide a recording and reproducing apparatus which is capable of accurately and promptly discriminating recording track pitches one from another without necessitating use of any additional head specially dedicated to the track pitch discriminating purpose.

Under this object, a recording and reproducing apparatus arranged as an embodiment of this invention to record a signal on a recording medium while forming recording tracks on the medium selectively at some of a plurality of different track pitches and to reproduce the signal from the recording medium comprises: a first rotating head for recording a signal on the recording medium; a second rotating head for erasing a signal recorded on the recording medium; and discrimination means for discriminating the pitch of recording tracks formed on the recording medium by using a signal reproduced by the second rotating head.

It is a further specific object of this invention to provide a reproducing apparatus which is of the kind arranged to reproduce an information signal from a record bearing medium having pilot signals of different kinds recorded together with the information signal in recording tracks and is provided with a head arrangement advantageously adapted for discriminating one recording track pitch from another.

Under that object, a reproducing apparatus arranged as another embodiment of this invention to reproduce an information signal from a record bearing medium on which pilot signals of an n number of different kinds are recorded along with the information signal one by one, one in each of recording tracks formed selectively at some of a plurality of different track pitches, said n number being an integer at least 3, comprising: a first rotary head arranged to reproduce the information signal from the record bearing medium; a second rotary head the width of which is at least n times as wide as the narrowest of said plurality of different track pitches; and discriminating means for discriminating the track pitch of recording tracks by using the pilot signals reproduced by the second rotary head.

These and further objects and features of this invention will become apparent from the following detailed description of preferred embodiments thereof taken in conjunction with the accompanying drawings.

BRIEF DESCRIPTION OF THE DRAWINGS

FIG. 2 is a plan view of the rotary drum of the same embodiment.

FIG. 3 shows heads as in a state of reproducing signals recorded in the SP mode on a recording tape.

DETAILED DESCRIPTION OF THE PREFERRED EMBODIMENTS

Figure 4:
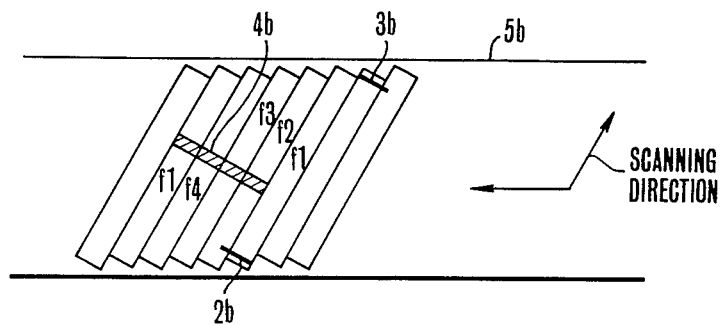
FIG. 4 shows heads as in a state of reproducing signals recorded in the LP mode.
Figure 5:
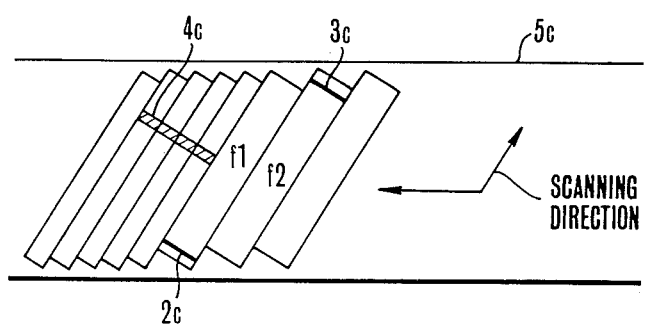
FIG. 5 shows the heads as in a state of reproducing signals from a tape on which some of these signals are recorded in the SP mode while others are recorded in the LP mode.

An embodiment of this invention is arranged as shown in FIGS. 1 to 5. Referring to these drawings, the illustrations include a rotary drum 1; rotary magnetic heads 2, 2a, 2b, 3, 3a, and 3b which are arranged on the drum 1 to perform recording and reproduction; a rotary erasing head 4, 4a, 4b or 4c which is also arranged on the drum 1 and is called a flying erase head (hereinafter referred to as FEH for short); a magnetic tape 5a, 5b or 5c. FIG. 2 is a plan view showing the rotary drum 1 in a state as viewed from above. The FEH 4 is mounted in between the magnetic heads 2 and 3. FIG. 3 shows the heads as in a state of reproducing signals recorded on the tape at an ordinary track pitch in a normal recording/reproducing mode (hereinafter referred to as the SP mode). FIG. 4 shows them as in a state of reproducing signals recorded in a long time recording/reproducing mode at a track pitch which is ½ of the ordinary track pitch (hereinafter referred to as the LP mode). FIG. 5 shows the heads as in a state of reproducing signals recorded both in the SP and LP modes. In these drawings, reference symbols f1 to f4 denote the recording frequencies of pilot signals which are recorded, one in each track, for the purpose of permitting tracking control by the known four-frequency method.

Figure 1:
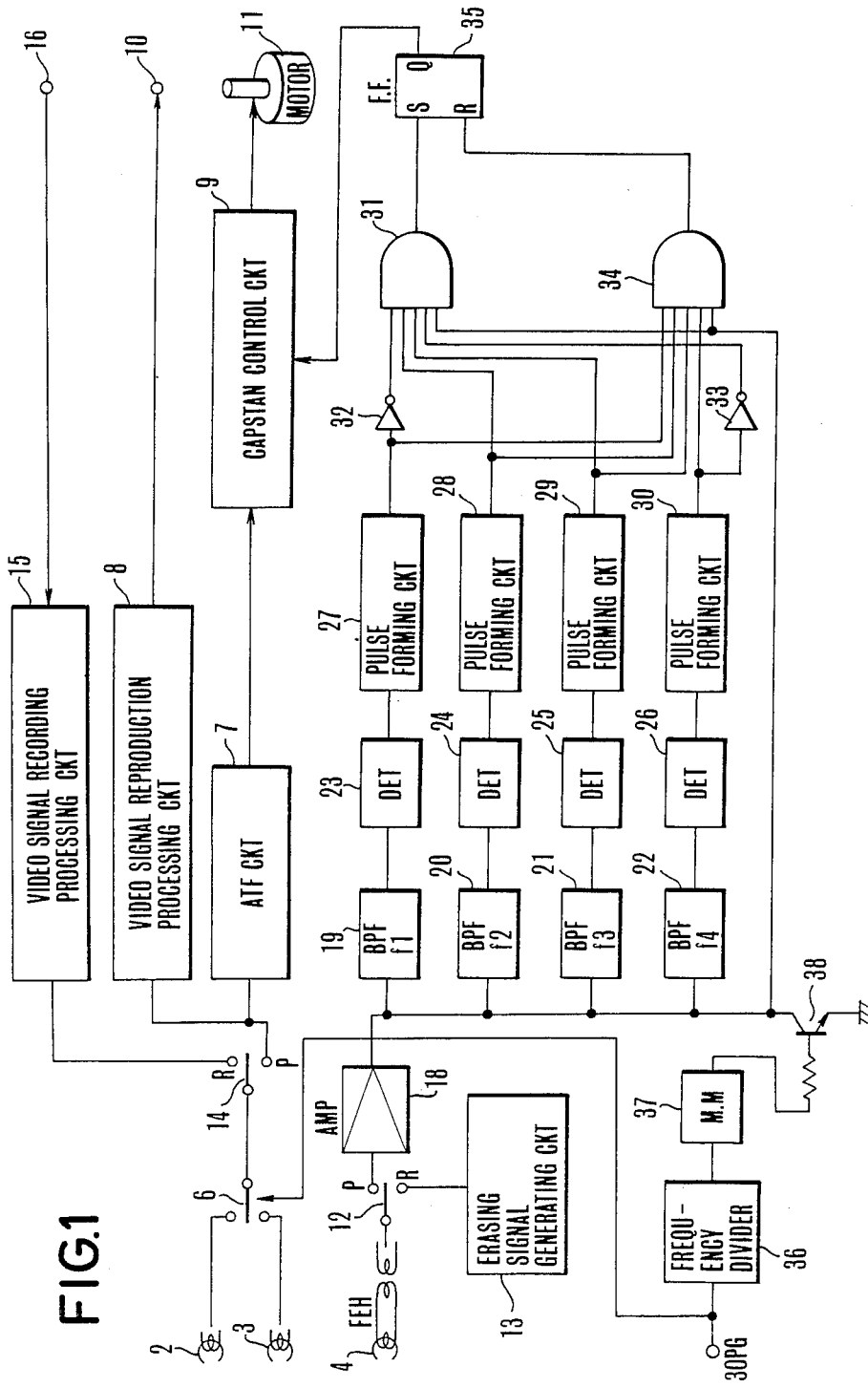
FIG. 1 is a block diagram showing the arrangement of essential parts of an apparatus arranged as an embodiment of this invention.
Figure 6:
FIG. 6 is a timing chart showing the operation of the apparatus of FIG. 1.
Figure 7:
FIG. 7 is another timing chart also showing the operation of the apparatus of FIG. 1.

FIG. 1 is a block diagram showing the circuit arrangement of the embodiment of this invention. FIGS. 6 and 7 show the operation of the embodiment in timing charts.

In the VTR which is arranged as mentioned above, the magnetic heads 2 and 3 are mounted on the drum 1 of FIG. 2. The FEH 4 which is also mounted on the drum differs 90 degrees in rotation phase from these magnetic heads 2 and 3 and is disposed somewhat higher than the heads 2 and 3. Their relative positions on the tape are as shown in FIG. 3. The head width of the FEH 4 is arranged to be such that, in the SP mode, the FEH 4 is capable of erasing a two-track portion of the record while the rotary drum 1 makes one turn. In case that the VTR is provided with a single FEH, the FEH must have a width corresponding to two tracks formed in the SP mode.

FIG. 3 shows the tape 5a which has been recorded in the SP mode and is now under a reproducing operation. When the magnetic heads 2a and 3a are in their positions on the record pattern of the tape 5a as shown in FIG. 3, the FEH 4a is capable of reproducing two different pilot signals recorded in two adjacent tracks by straddling the two tracks if it is utilized as a reproducing magnetic head.

FIG. 4 shows a record pattern formed with signals recorded on the tape 5b in the LP mode. In FIG. 4, the magnetic heads 2b, 3b and 4b are the same as the magnetic heads 2a, 3a and 4a shown in FIG. 3. In this instance the FEH 4b straddles four tracks to reproduce four pilot signals of different frequencies f1, f2, f3 and f4. Therefore, in cases where a record of the SP mode and that of the LP mode commingle on a tape 5c as shown in FIG. 5, the FEH 4c reproduces pilot signals of four different frequencies f1, f2, f3 and f4 while other magnetic heads 2c and 3c are reproducing the record of the SP mode. This enables the VTR to find the necessity of changing the tape speed from one speed which corresponds to the SP mode to another speed which corresponds to the LP mode. The circuit arrangement of the VTR embodying this invention is as shown in FIG. 1 while FIGS. 6 and 7 show its operation in timing charts.

Referring to FIG. 1, the illustration includes a head change-over switch 6; an ATF circuit 7 which is arranged to form a tracking error signal by using pilot signals reproduced by the rotary heads 2 and 3; a video signal reproduction processing circuit 8 which is arranged to process a video signal reproduced by the heads 2 and 3 into a signal form suited for use by a monitor or the like; a capstan control circuit 9 which is arranged to control a capstan motor 11 according to the tracking error signal from the ATF circuit 7 and a track pitch discrimination signal which will be described later; a video signal output terminal 10; and the capstan motor 11 which is arranged to longitudinally move the magnetic tape.

The capstan control circuit 9 determines the magnetic tape moving speed according to the track pitch discrimination signal and controls the capstan motor 11 to ensure that the recording tracks on the tape is accurately traced by the heads 2 and 3 according to the above-stated tracking error signal. Switches 12 and 14 are arranged to change their connecting positions according to recording or reproduction. Their positions are shifted to one side R for recording and to the other side P for reproduction. An erasing signal generating circuit 13 is arranged to supply an erasing signal to the FEH 4 when the VTR is performing recording. A recording signal processing circuit 15 is arranged to process the video signal which comes from a terminal 16 into a signal form suited for mangetic recording. The VTR includes an amplifier 18 which amplifies the signals reproduced by the FEH 4; band-pass filters 19, 20, 21 and 22 (hereinafter referred to as BPFs); detectors 23, 24, 25 and 26; pulse forming circuits 27, 28, 29 and 30; inverter circuits 32 and 33; AND circuits 31 and 34; a flip-flop 35; a frequency divider 36; a monostable multivibrator 37; and a transistor 38.

With the VTR arranged in this manner, reproduced pilot signals are obtained by shifting the position of the switch 12 to the side P to bring the FEH 4 into a reproducing mode and by amplifying the signals reproduced by the FEH 4 through the amplifier 18. Meanwhile, a head switching pulse signal (hereinafter referred to as 30-PG signal) which changes from a high level to a low level every 1/60 sec in synchronism with the rotation of the rotary drum is frequency divided by ½ at the frequency divider 36. Following this, the monostable multivibrator (M.M) 37 forms a timing pulse signal which is arranged to be at a low level only at a timing when the head 2a comes to trace a recording track in which the pilot signal of the frequency f1 is recorded. (See FIG. 6.)

As apparent from the timing chart of FIG. 6, the reproduced pilot signal is obtained, only when the head 2a is tracing the track in which the pilot signal of the frequency f1 is recorded, by turning off the transistor 38 by the output of the monostable multivibrator 37. The pilot signals thus taken out are applied to the BPFs 19, 20, 21 and 22 which have the frequencies f1, f2, f3 and f4 as their center frequencies. The signals thus passed through these BPFs are subjected to detection performed by detectors 23, 24, 25 and 26. The outputs of these detectors are supplied to pulse forming circuits 27, 28, 29 and 30 to obtain pulse signals.

With regard now to the output of the AND circuit 31, when the record of a track which is formed, for example, by the SP mode as shown in FIG. 3 is to be reproduced by the circuit arrangement of FIG. 1, there is a timing at which the pilot signals of the frequencies f2 and f3 are reproduced. In that instance, therefore, the pulse signals are produced from the pulse forming circuits 28 and 29. Meanwhile, the outputs of other pulse forming circuits 27 and 30 remain at a low level. However, the output levels of these pulse forming circuits 27 and 30 are inverted by the inverter circuits 32 and 33 and are supplied at a high level to the AND circuit 31. Then, the AND circuit 31 reproduces a pulse signal. In this instance, the output of the other AND circuit 34 remains at a low level. Therefore, the level of the Q output of the flip-flop 35 becomes high.

In case that a track having a record of the LP mode is traced for reproduction, pilot signals of all the frequencies f1, f2, f3 and f4 are simultaneously reproduced. Therefore, a pulse signal is produced from the AND circuit 34 while no pulse signal is produced from the AND circuit 31. Then, the flip-flop 35 is reset and produces a low level output.

Therefore, at a boundary between the SP mode tracks and the LP mode tracks as shown in FIG. 5, the output level of the flip-flop 35 changes from a high level to a low level as shown in the timing chart of FIG. 7, so that the change can be detected. The output signal of the flip-flop 35 thus serves as a track pitch discrimination signal, which is supplied to the capstan control circuit 9.

In the case of the circuit arrangement of the embodiment described, the recording track pitch also can be discriminated by using only the output of the AND circuit 34. This is possible, because: with the LP mode recording tracks traced for reproduction by the FEH 4, the pilot signals of all the four different frequencies f1 to f4 are simultaneously reproduced without fail, whereas the pilot signals of all these different frequencies are never simultaneously reproduced when the SP mode recording tracks are traced by the FEH 4.

What is claimed is:

1. A recording and reproducing apparatus arranged to record an information signal on a recording medium while forming recording tracks on said medium selectively at some of a plurality of different track pitches and to reproduce said information signal from said recording medium, comprising:
   (a) a first rotating head for recording said information signal and pilot signals of four different frequencies on said recording medium so that one of said pilot signals is recorded in each of said recording tracks one after another, and reproducing a signal from said recording medium;
   (b) a second rotating head for erasing a signal recorded on said medium when said first rotating head is recording a signal on said medium and for reproducing a signal from said medium when said first rotating head is reproducing a signal from said medium; and
   (c) discrimination means for discriminating the pitch of recording tracks formed on said recording medium, said discrimination means including four separating means arranged to separate said pilot signals of four different frequencies from a signal reproduced by said second rotating head, and detecting means arranged to detect, by using signals separated by said four separating means, that said pilot signals of all the four different frequencies are being simultaneously reproduced by said second rotating head.

2. An apparatus according to claim 1, further comprising:
   moving means for moving said recording medium in the direction of intersecting said recording tracks; and
   changing means for changing the recording medium moving speed of said moving means on the basis of the discrimination output of said discrimination means.

3. An apparatus according to claim 1, wherein the width of said second rotating head is arranged to be at least four times as wide as the narrowest of said plurality of different track pitches 4. An apparatus according to claim 1, wherein the width of said second rotating head is arranged to be at least two times as wide as a widest one among said plurality of different track pitches; and said discrimination means further includes detecting means which is arranged to detect, by using signals separated by said four separated means, that only the pilot signals of two specific frequencies are being reproduced by said second rotating head among said four different frequencies.

5. An apparatus according to claim 1, further comprising control means for controlling the positions of one of said recording tracks and said first rotating head relative to each other by using said pilot signals which are reproduced by said first rotating head.

6. An apparatus according to claim 5, wherein video signals are recorded together with said pilot signals in said recording tracks; and said first rotating head is arranged to reproduce said video signals.

7. A reproducing apparatus arranged to reproduce an information signal from a record bearing medium on which pilot signals of an n number of different kinds are recorded along with said information signal, one in each of recording tracks formed selectively at some of a plurality of different track pitches, said n number being an integer at least 3, comprising:
   (a) a first rotary head arranged to reproduce the information signal from the record bearing medium;
   (b) a second rotary head the width of which is at least n times as wide as a narrowest one among said plurality of different track pitches for reproducing a first signal from said record bearing medium including one or more of the pilot signals; and
   (c) discriminating means for discriminating the track pitch of said recording tracks by using said first signal reproduced by the second rotary head.

8. An apparatus according to claim 7, wherein said discriminating means includes the n number of separating means for separating pilot signals of the n number of different kinds from said first signal reproduced by said second rotary head; and detecting means for detecting, by using signals separated by said n number of separating means, that said second rotary head is reproducing the pilot signals of all said n number of different kinds.

9. An apparatus according to claim 8, wherein the width of said second rotary head is arranged to be approximately m times (m being an integer smaller than n) as wide as a widest one among said plurality of different track pitches; and said discriminating means further includes detecting means for detecting, by using the signals separated by said n number of separating means, that said second rotary head is reproducing pilot signals of only m number of specific kinds among said pilot signals of the n number of different kinds.

10. An apparatus according to claim 9, wherein n is 4 and m is 2.

11. An apparatus according to claim 7, further comprising control means for controlling the positions of one of said recording tracks and said first rotary head relative to each other by using said pilot signals which are reproduced by said first rotary head.

12. An apparatus according to claim 7, further comprising erasing signal generating means arranged to supply said second rotary head with an erasing signal for erasing an information signal recorded on said record bearing medium.

13. A reproducing apparatus arranged to reproduce an information signal from a record bearing medium on which pilot signals of four different kinds are recorded along with said information signal, one in each of recording tracks formed selectively at some of a plurality of different track pitches, comprising:
   (a) a first rotary head arranged to reproduce the information signal from the record bearing medium;
   (b) a second rotary head the width of which is wider than that of said first rotary head; and
   (c) discrimination means for discriminating the pitch of recording tracks formed on said recording medium, said discrimination means including four separating means arranged to separate said pilot signals of four different frequencies from a signal reproduced by said second rotating head, and detecting means arranged to detect, by using signals separated by said four separating means, that said pilot signals of all the four different frequencies are being simultaneously reproduced by said second rotating head.

14. An apparatus according to claim 13, further comprising:

moving means for moving said recording medium in the direction of intersecting said recording tracks; and changing means for changing the recording medium moving speed of said moving means on the basis of the discrimination output of said discrimination means.

15. An apparatus according to claim 13, further comprising control means for controlling the positions of one of said recording tracks and said first rotary head relative to each other by using said pilot signals which are reproduced by said first rotary head.

16. An apparatus according to claim 13, further comprising erasing signal generating means arranged to supply said second rotary head with an erasing signal for erasing an information signal recorded on said record bearing medium.

* * * * *